United States Patent [19]
McElroy et al.

[11] Patent Number: 5,886,648
[45] Date of Patent: Mar. 23, 1999

[54] AUTOMATED VEHICLE WASH SYSTEM WITH VEHICLE TYPE RECOGNITION

[75] Inventors: Lucian G. McElroy, Carefree, Ariz.; Alexander B. Faytlin, Southfield, Mich.

[73] Assignee: Proto-Vest, Inc., Glendale, Ariz.

[21] Appl. No.: 17,127

[22] Filed: Feb. 2, 1998

[51] Int. Cl.[6] .............................. G08G 1/04; A47L 5/38
[52] U.S. Cl. .................. 340/943; 340/933; 15/316.1; 15/DIG. 2; 134/123
[58] Field of Search .................... 340/933, 935, 340/941, 943, 932.2; 701/117; 15/312.1, 316.1, 319, DIG. 2; 34/541, 666; 134/56 R, 57 R, 58 R, 123, 181

[56] References Cited

U.S. PATENT DOCUMENTS

| | | | |
|---|---|---|---|
| 3,063,179 | 11/1962 | Auer, Jr. .................................. | 340/943 |
| 3,141,612 | 7/1964 | Bolton ................................. | 235/99 R |
| 3,317,892 | 5/1967 | Schwarz ................................. | 340/943 |
| 4,187,487 | 2/1980 | Numata et al. ........................... | 367/93 |
| 4,674,069 | 6/1987 | Mizuno ..................................... | 367/90 |
| 4,789,941 | 12/1988 | Nunberg ..................................... | 701/117 |
| 4,836,467 | 6/1989 | Rodgers ................................. | 15/316 R |
| 4,949,423 | 8/1990 | Larson et al. .......................... | 15/316 R |
| 5,029,094 | 7/1991 | Wong ....................................... | 705/418 |
| 5,148,570 | 9/1992 | Crotts et al. .......................... | 15/DIG. 2 |
| 5,173,692 | 12/1992 | Shapiro et al. .......................... | 340/943 |
| 5,421,102 | 6/1995 | McElroy et al. ....................... | 15/316.1 |
| 5,447,574 | 9/1995 | Inoue ...................................... | 134/123 |
| 5,454,136 | 10/1995 | Gougoulas ............................. | 15/312.1 |

Primary Examiner—Daniel J. Wu
Assistant Examiner—Van T. Trieu
Attorney, Agent, or Firm—Howard & Howard

[57] ABSTRACT

An automated car wash system includes a device for recognizing the types of vehicles passing through the system. The vehicle type recognition device includes two ultrasonic sensors positioned above the vehicle pathway to determine a vehicle profile. A computer recognizes the vehicle profile and type by monitoring a relationship between signals present at each sensor. The computer communicates the vehicle type information to a dryer controller that controls the position of the dryer relative to the vehicle.

20 Claims, 1 Drawing Sheet

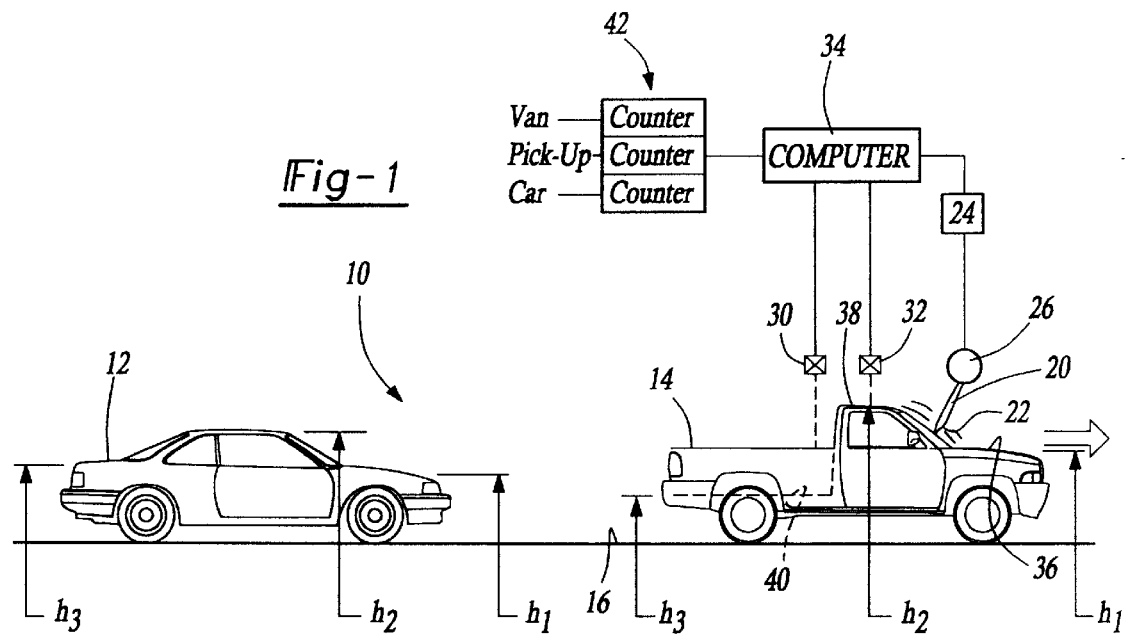
Fig-1
Fig-2
| SENSOR 30 L M H | SENSOR 32 M H | VEHICLE TYPE/CLASS |
|---|---|---|
| X 1 0 | 1 0 | CAR |
| 1 0 0 | X 1 | PICK-UP OPEN BED |
| 1 1 0 | X 1 | PICK-UP CLOSED BED |
| X X 1 | X 1 | VAN |
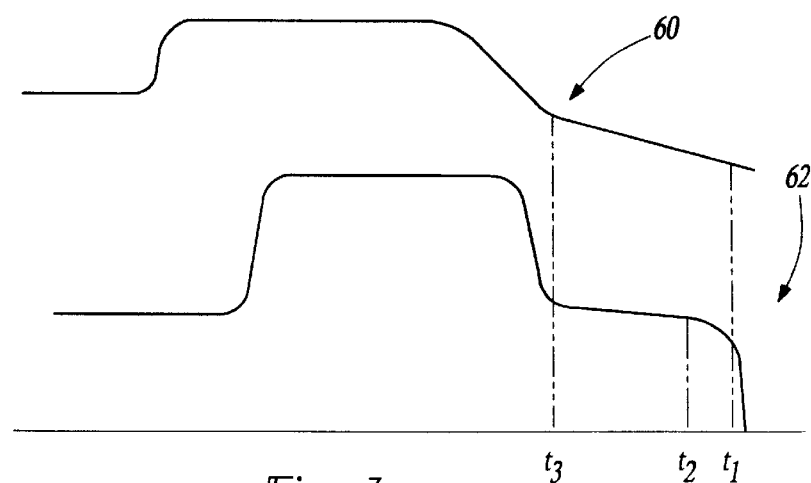
Fig-3

AUTOMATED VEHICLE WASH SYSTEM WITH VEHICLE TYPE RECOGNITION

BACKGROUND OF THE INVENTION

This invention generally relates to a device for determining the number and types of vehicles passing through an automated car wash system. More specifically, this invention relates to a device and method for determining the number and types of vehicles passing through an automated car wash using ultrasonic sensors that determine the height of different portions of each vehicle.

Current automated car washes typically include dryer bags that provide a flow of air over the vehicle surface as the vehicle approaches the exit of the car wash. A variety of dryer bag arrangements are known. Some arrangements include controllers that position the dryer bags at a preselected distance from the surface of the vehicle to ensure sufficient drying. Such controllers typically include sensors mounted on the end of the bag that detect the presence of the surface of the vehicle as the vehicle moves through the drying stage of the automated car wash.

While such conventional systems are useful, they are not without shortcomings and drawbacks. For example, such systems do not distinguish between vehicle types and, therefore, cannot provide any special dryer position control that may be desirable under certain circumstances. For example, when an open bed pick-up truck is moving through the automated car wash, it is often possible that the open bed contains mud or other substances when the vehicle is approaching the drying stage in the car wash. With conventional sensors, a dryer bag typically is positioned very close to the horizontal surface of the open truck bed. This introduces the likelihood that the dryer bag will become dirty as the mud or other substances are blown about within the truck bed. Further, the mud or other substances may contaminate the sensors positioned on the bag, which results in faulty operation of the bag position controller as subsequent vehicles pass through the drying stage of the car wash.

Therefore, it is desirable to provide a system that controls the position of a dryer within an automated car wash based upon a recognition of the type of vehicle that is currently entering the dryer stage of the car wash. This invention addresses that need by providing a system where sensors are positioned above the pathway of the vehicle that facilitate recognizing the type of vehicle. Vehicle type recognition systems have been proposed in the past. An example of such a system is shown in U.S. Pat. No. 5,173,692. That system includes ultrasonic sensors that measure the heights of various portions of a vehicle, which information is used to determine the number and type of vehicles passing beneath the sensors. Prior to this invention, however, no one has suggested using a vehicle type recognition system for controlling an automated car wash as will be described below.

SUMMARY OF THE INVENTION

In general terms, this invention is a system for controlling the operation of an automated car wash that includes a dryer supported over a pathway along which a vehicle travels through the car wash. A first sensor is supported above the pathway in a position where a vehicle passes beneath the first sensor prior to approaching the dryer. The first sensor repeatedly sends signals toward the pathway and receives reflected signals that reflect from a surface beneath the first sensor. The surface beneath the first sensor will include the pathway itself and the various portions of the vehicle as it moves along the pathway beneath the first sensor. A second sensor, preferably like the first sensor, is positioned further down the pathway. The system includes a microprocessor or other appropriate circuitry for detecting a value of the reflected signals that are received by the first and second sensors, respectively. A vehicle type determining means determines a difference between the reflected signals received at the first and second sensors and determines a type of vehicle moving along the pathway, using the relationship between the reflected signals. A controller controls the position of the dryer relative to the pathway responsive to the determined type of vehicle moving along the pathway.

In the preferred embodiment, the controller prevents the dryer from moving below a preselected level whenever the determined type of vehicle is an open bed pick-up truck. The controller, therefore, prevents the dryer from becoming undesirably close to the open bed of a pick-up truck where it would otherwise possibly become undesirably dirty or where a sensor associated with the dryer could become contaminated because of the presence of mud or other substances within the open bed of the pick-up truck.

The method of this invention for controlling a dryer in a car wash includes several basic steps. First, two sensors are positioned in succession above a pathway in the car wash. The sensors repeatedly send signals toward the path. A vehicle is moved along the pathway while the sensors repeatedly receive reflected signals that reflect from an upper surface of the vehicle passing beneath the sensors. A value of the received reflected signals at each sensor is determined and a relationship between the values of the received reflected signals is used to determine the type of the vehicle moving along the pathway beneath the sensors. The position of the dryer is controlled responsive to the determined type of vehicle in order to avoid undesirable contamination of the dryer or sensors associated with the dryer.

The various features and advantages of this invention will become apparent to those skilled in the art from the following detailed description of the presently preferred embodiment. The drawings that accompany the detailed description can be briefly described as follows.

BRIEF DESCRIPTION OF THE DRAWINGS

FIG. 1 is a schematic illustration of a system designed according to this invention.

FIG. 2 is a table illustrating vehicle classification logic that is utilized in the preferred method of this invention.

FIG. 3 is a timing diagram illustrating an advantageous feature of this invention.

DETAILED DESCRIPTION OF THE PREFERRED EMBODIMENT

FIG. 1 schematically illustrates a system 10 for controlling selected portions of an automated car wash. Two vehicles 12 and 14 are illustrated moving along a pathway 16 from left to right (according to the drawing) through the automated car wash. The phrase "car wash" as used in this specification means an automated system for washing passenger vehicles including cars, vans, trucks and sport utility vehicles.

A conventional dryer 20, which includes, for example, a blower and an air bag for directing the air against the surface of the vehicle, is supported above the pathway 16. A conventional sensor 22 is provided near the end of the dryer 20. The sensor 22 facilitates positioning the end of the dryer 20 relative to the upper surface of the vehicle as the vehicle moves along the pathway 16. Such sensors are known and typically maintain the end of the dryer 20 within a specified distance from the vehicle surface. The sensor 22 communicates with a controller 24 that controls the operation of a dryer mover 26. The controller 24 can be any conventional microprocessor or dedicated circuitry as is known in the art. The conventional mover 26 moves the dryer 20 into the various positions required as a vehicle passes through the drying stage of the automated car wash along the pathway 16.

A first sensor 30 and a second sensor 32 are supported above the pathway 16. The first sensor 30 and the second sensor 32 preferably are ultrasonic sensors as are known in the art. The first and second sensors preferably repeatedly emit ultrasonic signals that are directed toward the pathway 16 and reflect from a surface beneath the sensors, respectively. The reflected signals are received at the sensors 30 and 32 and conventional techniques are utilized to determine a distance between the sensors and the surface from which the reflected signal reflected. A controller 34 includes the necessary components and/or software for interpreting the information gained from the reflected signals received by the first sensor 30 and the second sensor 32, respectively.

The first and second sensors 30 and 32 are useful for determining the heights of the various portions of a vehicle. The relationship between the heights of the various portions of the vehicle provides the ability for the computer 34 to determine what type of vehicle is moving along the pathway 16 beneath the sensors 30 and 32.

The first and second sensors 30 and 32 most preferably are positioned to encounter a vehicle before the vehicle enters the drying stage of the automatic wash system. The computer 34, therefore, is able to identify the vehicle type or classification before the vehicle encounters the dryer 20. The computer 34 preferably controls the position of the dryer 20 based upon the determined vehicle type as described below.

The first sensor 30 preferably is spaced 2.5 feet away from the second sensor 32. The first sensor also preferably is the first one that encounters a vehicle moving along the pathway 16. The computer 34 preferably detects a value associated with each of the reflected signals. When there is no vehicle present beneath the sensors 30 and 32, for example, the value of the reflected signals received at each sensor will be equal and will be indicative of the distance between the sensors and the surface of the pathway 16.

As a vehicle moves along the pathway 16 beneath the sensors, the values of the reflected signals will change with the changing contour of the vehicle moving along the pathway 16. Taking the open bed pick-up vehicle 14 as an example, the first sensor 30 will receive reflected signals that indicate the presence of the surface of the hood of the vehicle followed by the windshield and roof of the vehicle and then followed by the interior horizontal surface of the open bed 40. The signals reflecting from the hood 36 will indicate a reflecting surface at a height $h_1$. Similarly, the signals that reflect from the roof 38 will indicate a reflecting surface at a height $h_2$ and the signals reflecting from the truck bed 40 will indicate a reflecting surface at a height $h_3$. The changes between the values of the reflected signals indicates a profile of the vehicle 14.

The computer 34 determines a relationship between the values of the reflected signals received at the first sensor 30 and the second sensor 32, respectively, to thereby determine the profile of the vehicle moving along the pathway 16. The vehicle profile information then provides an identification of the type of vehicle.

FIG. 2 is a table illustrating a preferred logic scheme for determining the type of vehicle. The computer 34 preferably includes appropriate circuitry, components or software for recognizing three different levels of reflected signals from the first sensor 30; a first level indicating a low reflecting surface, a second level indicating a medium height reflecting surface and a third level indicating a high reflecting surface. The computer 34 need only distinguish between two levels of reflecting surfaces passing beneath the second sensor 32 in order to implement the preferred embodiment of the method of this invention.

As the vehicle moves beneath the first and second sensors 30 and 32, the computer 34 monitors the relationship between the received reflected signals at each sensor. When, the reflected signals indicate a medium height reflecting surface at both sensors, the computer 34 determines that the vehicle is a car. This is indicated in the row 50 of FIG. 2. Since the first and second sensors preferably are spaced apart 2.5 feet and the average roof of a car is longer than 2.5 feet, the condition illustrated in row 50 of FIG. 2 is possible. Further, the computer 34 preferably is programmed to recognize a medium height reflecting surface within the range of the average roof of a car. The average range for the various portions of vehicle surfaces can be determined depending upon currently marketed automobile body types for cars, pick-up trucks and vans or sport utility vehicles, for example.

As illustrated in row 52, whenever the reflecting signal of the first sensor 30 indicates a low height reflecting surface simultaneous with the second sensor 32 indicating a high height reflecting surface, the computer 34 determines that the vehicle is a pick-up truck with an open bed. Similarly, row 54 indicates when the computer 34 determines the vehicle to be a pick-up truck having a covered bed with, for example, a fabric cover stretched over the bed on the back of the pick-up truck. The row 56 indicates the conditions where the computer 34 determines that the vehicle moving along the pathway 16 is a van; namely when the first and second sensors 30 and 32 both determine that a high leveled reflecting surface is beneath each of them simultaneously.

The X's in FIG. 2 indicate a logic state that does not matter based upon the detected logic states at the remaining height levels in a particular row.

After determining the type of vehicle moving along the pathway 16, the computer 34 communicates that information to the dryer controller 24. The dryer controller 24 then responsively controls the height of the dryer 20 depending on the vehicle identification information. In conventional systems, the dryer 20 would be moved up and down relative to the surface of the vehicle passing beneath the dryer 20 regardless of the type of vehicle. Under some conditions, this is not desirable. A prime example is when an open bed pick-up truck is passing through the automated car wash. In many circumstances, the open truck bed can have mud or other substances remaining in it even though the pick-up truck has already passed through the washing stage of the automated car wash. If the dryer 20 is placed too deep within the bed of the pick-up truck, there is a likelihood that the mud or other substances will be splashed off of the interior lateral walls of the bed or the interior of the tailgate and onto the dryer 20 and/or the sensor 22. This is undesirable because any mud remaining on the dryer 20 may later drip onto another vehicle passing through the automated car wash. Moreover, mud or other contaminants on the sensor 22 may interfere with the operation of the sensor 22, which would result in improper positioning of the dryer 20 relative to subsequent vehicles passing through the automated car wash. In order to avoid such situations, this invention includes the feature of having the controller 24 control the position of the dryer 20 based upon the identification of the vehicle type provided by the computer 34.

Whenever the computer 34 determines that the vehicle approaching the dryer 20 is a pick-up truck, the controller 24 ensures that the dryer 20 will not be positioned below a predetermined level while the pick-up truck is passing through the drying stage. For example, the controller 24 controls the dryer mover 26 so that the dryer position 20 remains at the height it is placed into to dry the roof of the vehicle. The dryer 20 can remain in this locked height position until the sensor 30 detects the presence of a subsequent vehicle or after a preselected time period expires. By preventing the dryer 20 from moving too close to the horizontal surface 40 of the open truck bed, the possibility for contaminating the sensor 22 or for getting the dryer 20 dirty is eliminated.

An additional feature of the preferred embodiment of this invention is to include a counter 42 that counts the number of vehicles of each type that passes through the automated car wash. For simplicity, only three categories or vehicle types are illustrated including van, pick-up and car. Vehicles such as the currently popular sport utility vehicles or pick-up trucks having hard cover caps over their beds with a height approximately equal to the roof of the pick-up truck can each be categorized as a "van" since the vehicle profile (as determined by the sensors 30 and 32) resembles that of a van under most circumstances. In situations where it may be necessary to distinguish between vans and sport utility vehicles, for example, the sensitivity of the sensors 30 and 32 and the determinations made by the computer 34 can be modified appropriately.

FIG. 3 is a timing diagram illustrating another advantageous feature of this invention. FIG. 3 illustrates sample vehicle profiles 60 and 62. The vehicle profile 60 corresponds to a car while the profile 62 corresponds to a pick-up truck. The time $t_1$ indicates the first instant where the first sensor 30 detects the presence of a vehicle along the pathway 16. A second time $t_2$ indicates when the first sensor 30 first determines the maximum height of the hood of the pick-up truck having the profile 62. The time $t_3$ indicates the instant where the computer 34 first determines the maximum height of the hood of the car having the profile 60. As can be seen from the profiles 60 and 62, the difference between the time $t_1$ and $t_2$ is far less than the difference between the time $t_1$ and $t_3$.

The computer 34 preferably determines a time between when the first sensor 30 first detects the presence of a vehicle and the first instant where the maximum height of the hood of the vehicle is detected. If that time period is within a preselected window (one second, for example), then the computer 34 makes an initial determination that the vehicle is a pick-up truck. Such a determination takes into account the typical profile of a car compared to the typical profile of a pick-up. As illustrated in FIG. 3, for example, cars typically have a gradual slope from the front end of the car to the highest point on the hood of the vehicle. Pick-up trucks, on the other hand, typically have an abrupt change in height that remains generally constant until the windshield of the truck. By recognizing the rate of change of the height of the hood of the vehicle, the computer 34 makes an initial determination whether the vehicle is a car or a pick-up truck. This initial determination preferably is verified by the later determination of the relationships between the signals received by the sensors 30 and 32 as the vehicle passes beneath them. If the computer 34 verifies that the vehicle is a pick-up truck, it communicates that information to the dryer controller 24 which appropriately controls the dryer as described above.

The preceding description is exemplary rather than limiting in nature. Variations and modifications to the disclosed embodiment may become apparent to those skilled in the art that do not necessarily depart from the purview and spirit of this invention. The scope of legal protection given to this invention can only be determined by studying the following claims.

We claim:

1. A method of controlling a dryer in an automated vehicle wash system, comprising the steps of:
   (A) positioning two sensors in succession above a pathway in the car wash;
   (B) repeatedly sending signals from the sensors toward the path;
   (C) moving a vehicle once in a signal direction along the pathway;
   (D) repeatedly receiving reflected signals that reflect from an upper surface of the vehicle passing beneath the sensors, respectively;
   (E) determining a value of the received reflected signals at each sensor;
   (F) determining a relationship between the values of the received reflected signals at each sensor as the vehicle moves along the pathway beneath the sensors;
   (G) determining a type of the vehicle moving along the pathway, using the relationship of step (F); and
   (H) controlling a position of the dryer responsive to the type of vehicle determined in step (G).

2. The method of claim 1, wherein step (H) includes preventing the dryer from moving below a predetermined level when the type of vehicle determined in step (G) indicates that the vehicle is an open bed pick up truck.

3. The method of claim 1, further comprising controlling the position of the dryer responsive to a contour of the vehicle such that the dryer is positioned approximately a preselected distance away from the surface of the vehicle.

4. The method of claim 3, wherein step (G) includes determining whether the vehicle type is in one of three categories consisting of car, van and pick up truck.

5. The method of claim 4, wherein step (G) further includes determining when the vehicle type is in the pick up truck category and further determining whether the pick up truck has an open or a covered bed portion.

6. The method of claim 5, wherein step (H) includes preventing the dryer from approaching the preselected distance from the bed portion of the pick up truck when the vehicle is an open bed pick up truck and maintaining the dryer at a selected height above the open bed portion of the vehicle while the open bed portion passes beneath the dryer.

7. The method of claim 6, further comprising maintaining the dryer at the selected height until a preselected time period elapses or another vehicle moving along the pathway passes beneath the sensors.

8. The method of claim 1, further comprising counting the number of vehicles moving along the pathway.

9. The method of claim 1, further comprising the steps of:
   determining a first time when the received reflection of the signal first sensor first indicates that the vehicle is beneath the sensor;
   determining a second time when the received reflection of the signal first indicates a maximum height of a hood portion of the vehicle;
   determining a time difference between the first time and the second time; and
   determining the type of vehicle beneath the sensors based upon the time difference.

10. The method of claim 9, wherein determining the second time includes continuously determining a height of the hood portion of the vehicle, monitoring a change in the height of the hood portion, determining an average height of the hood portion and determining the second time as the time when the average height is first detected.

11. A device for controlling the operation of a dryer in an automated car wash system, comprising:

a dryer supported over a pathway along which a vehicle travels once in a single direction through the car wash;

a first sensor supported above the pathway in a position where a vehicle passes beneath said first sensor prior to approaching said dryer, said first sensor repeatedly sending first signals toward the pathway and receiving first reflected signals that reflect from a surface beneath said first sensor;

a second sensor supported above the pathway and spaced from the first sensor such that the vehicle passes beneath said second sensor after passing beneath said first sensor, said second sensor repeatedly sending second signals toward the pathway and receiving second reflected signals that reflect from a surface beneath said second sensor;

value detecting means for detecting a value of said first reflected signals and said second reflected signals, respectively;

vehicle type determining means for determining a relationship between said values of said first and second reflected signals and determining a type of the vehicle moving along the pathway; and a controller that controls a position of said dryer responsive to the vehicle type determined to be moving along the pathway.

12. The device of claim 11, wherein said controller determines a height of said dryer above said pathway and selectively maintains said dryer at a selected height for selected portions of selected vehicle types.

13. The device of claim 12, wherein said vehicle type determining means determines whether the vehicle is of a type from the group consisting of van, car or pick up truck.

14. The device of claim 13, wherein said controller maintains said dryer at said selected height while a bed portion of the vehicle passes beneath said dryer when the vehicle type is a pick up truck.

15. The device of claim 13, wherein said vehicle type determining means further determines whether the vehicle is an open bed pick up truck or a pick up truck with a covered bed portion and wherein said controller maintains said dryer at said selected height only when the vehicle type is an open bed pick up truck.

16. The device of claim 11, further comprising a counter for counting the number of vehicles moving along the pathway through the automated vehicle wash system.

17. The device of claim 11, wherein said vehicle type determining means and said value detecting means each comprise a microprocessor.

18. The device of claim 11, wherein said vehicle type determining means, said value detecting means and said controller each comprise dedicated circuitry.

19. A method of determining a type of vehicle moving along a path through an automated vehicle wash system, comprising the steps of:

(A) positioning a sensor above the path along which the vehicle moves;

(B) repeatedly sending a signal from the sensor toward the path;

(C) repeatedly receiving a reflection of the signal from step (B) that reflects from a surface beneath the sensor;

(D) moving a vehicle along the path through a position where the signal of step (B) is incident upon an upper surface of the vehicle;

(E) determining a first time when the received reflection of the signal first indicates that the vehicle is beneath the sensor;

(F) determining a second time when the received reflection of the signal first indicates a maximum height of a hood portion of the vehicle;

(G) determining a time difference between the first time of step (E) and the second time of step (F); and (H) determining the type of vehicle beneath the sensors based upon the time difference of step (G).

20. The method of claim 19, wherein step (F) includes continuously determining a height of the hood portion of the vehicle, monitoring a change in the height of the hood portion, determining an average height of the hood portion and determining the second time as the time when the average height is first detected.

* * * * *